United States Patent [19]

Downey et al.

[11] Patent Number: 4,533,598

[45] Date of Patent: Aug. 6, 1985

[54] EXTENDED POLYURETHANES

[75] Inventors: William J. Downey, Linden; Melvin Brauer, East Brunswick, both of N.J.

[73] Assignee: CasChem, Inc., Bayonne, N.J.

[21] Appl. No.: 553,196

[22] Filed: Nov. 18, 1983

[51] Int. Cl.$^3$ .............. C08K 5/01; C08L 75/04; H01B 3/30

[52] U.S. Cl. .............. 428/380; 174/25 C; 174/50.5; 174/52 PE; 174/68 A; 156/48; 156/49; 264/272.13; 427/58; 427/117; 428/379; 428/383; 523/173; 524/768; 524/773; 524/775; 524/848; 524/871; 524/873; 524/875

[58] Field of Search .............. 523/173; 524/871, 875, 524/848, 775, 773, 873, 768; 428/379, 380

[56] References Cited

U.S. PATENT DOCUMENTS

| | | | |
|---|---|---|---|
| 3,047,520 | 7/1962 | Fiel | 260/18 |
| 3,136,732 | 6/1964 | Kaestner | 260/33.6 |
| 3,338,861 | 8/1967 | Mastin et al. | 260/33.6 |
| 3,390,119 | 6/1968 | Alexander | 524/871 |
| 3,748,294 | 7/1973 | Kershow et al. | 260/22 |
| 3,801,532 | 4/1974 | Olstowski | 260/33.8 |
| 3,869,421 | 3/1975 | Sapp et al. | 260/33.6 AQ |
| 3,883,465 | 5/1975 | Olstowski | 260/31.2 |
| 3,886,102 | 5/1975 | Olstowski | 260/18 TN |
| 3,886,111 | 5/1975 | Yoshimura et al. | 260/31.2 N |
| 3,933,725 | 1/1976 | Dearlove | 524/848 |
| 3,963,656 | 6/1976 | Meisert et al. | 260/18 TN |
| 3,980,606 | 9/1976 | Werner | 260/31.8 R |
| 4,067,834 | 1/1978 | Olstowski | 260/18 TN |
| 4,076,660 | 2/1978 | Olstowski | 260/9 |
| 4,102,716 | 7/1978 | Groves | 524/871 |
| 4,122,058 | 10/1978 | Olstowski | 524/871 |
| 4,171,998 | 10/1979 | Brauer et al. | 156/48 |
| 4,176,239 | 11/1979 | Brauer et al. | 174/23 C |
| 4,231,986 | 11/1980 | Brauer et al. | 264/272 |
| 4,264,486 | 4/1981 | McLaughlin | 260/33:6 UB |
| 4,281,210 | 7/1981 | Brauer et al. | 174/23 C |
| 4,373,057 | 2/1983 | Hammond | 524/700 |
| 4,375,521 | 5/1983 | Arnold | 523/173 |
| 4,396,053 | 8/1983 | Davis | 524/871 |

*Primary Examiner*—C. Warren Ivy
*Attorney, Agent, or Firm*—Pennie & Edmonds

[57] ABSTRACT

A cyclic olefin extended polyurethane system comprising the reaction product of an isocyanate terminated polyisocyanate with a polyol in the presence of a cyclic olefin extender and, optionally, a liquid ester or other type of extender. Said polyurethane systems are cured, crosslinked, non-spewing, grease compatible, and reenterable. This extended polyurethane is further characterized as having superior insulating properties so that it can be used for repairing, encapsulation or reclaiming electrical or telephone cables as well as hard volume encapsulants for general elastomer use. The extended polyurethane is comprised of a defined polyurethane, novel extender combinations, and optionally, a coupling agent.

44 Claims, No Drawings

EXTENDED POLYURETHANES

TECHNICAL FIELD

The invention relates to polyurethanes extended with cyclic olefins which may be formulated as a non-spewing material for use in reclaiming or sealing electrical cables or devices and other uses.

BACKGROUND ART

It is well-known in the art to extend polymers such as polyurethanes. The extended material will then be designated for use in a desired area of utility. Typical of such extending agents is mineral oil, such mineral oil extended polyurethanes being disclosed in U.S. Pat. Nos. 3,714,110 and 3,747,037.

It has also been determined that the mineral oil extended polyurethane is useful in the reclamation and protection of insulated electrical devices. Such a device may, for example, be underground telephone cables which are exposed to fluid contaminants. These contaminants can seriously impair the electrical and mechanical properties of the device. The protectant material is pumped into the cable to remove water that has penetrated into interior free spaces. The material is pumped at low viscosity to achieve an appropriate distribution and then cures in place to a high viscosity. The cured material acts as a hydrophobic barrier to subsequent water penetration. In another application, this material may be utilized as an encapsulant for sealing sections of cable. In this manner, the material serves to prevent, from the outset, the penetration of fluid contaminants.

A mineral oil extended polyurethane useful for this purpose is disclosed in U.S. Pat. No. RE 30,321. That patent defines a cured, cross-linked, mineral oil extended polyurethane prepared from specific polyurethanes and coupling agents, the latter being necessary to compatibilize the mineral oil with the cross-linking urethane elastomer.

Disadvantages of these mineral oil extended polyurethane systems were, however, discovered and described in U.S. Pat. No. 4,168,258. There it was stated that with the earlier mineral oil extended polyurethanes, the mineral oil would tend to migrate toward any grease present in the cable or device to be reclaimed or encapsulated. This grease is encountered more frequently in newer insulated electrical devices. The migration was indicated as causing the formation of an oily film at the grease interface which tended to decrease the reclamation and encapsulant effectiveness of the polyurethane. In order to avoid these difficulties, that patent specifically defined a polyurethane-mineral oil-coupling agent formulation relying on the presence of a polydiene moiety in the polyurethane structure. Mineral oil remained as the extending agent, with the stated preference for including some aromatic carbon content therein.

It is also known that previous polyurethane compositions have been difficult to re-enter after they have fully cured due to their high cast strength and opaque or cloudy color. The high cast strength of these prior art polyurethanes contributes to the difficulty of cutting through or removing cured material from a repaired area, and the opaque color makes it difficult for the operator to establish the exact location to reenter a repair. The ability of these polyurethanes to be easily reentered is important in the repair or encapsulation of insulated electrical or telephone cables when a second splice or connection must be made in the same area as the previous repair or encapsulation. There are also situations where the initial repair or encapsulation is improperly made and has to be re-done.

A vegetable oil extended polyurethane which satisfied these requirements and resolved the reenterability problem is disclosed in U.S. Pat. No. 4,375,521. There, vegetable oil extended polyurethanes comprising a specified polyurethane, a vegetable oil, and a specified plasticizer agent were disclosed for use in reclamation and encapsulation applications. However, these vegetable oil extended formulations tend to cause cracking or stressing of the polycarbonate connectors which are usually present in the cable unit being encapsulated or repaired.

In U.S. Pat. No. 4,355,130, a polyalphaolefin extended polyurethane is disclosed which resolves the stress cracking problem. Such polyalphaolefin extended polyurethanes comprise a specified polyurethane, a specified polyalphaolefin, and, for reclamation and encapsulation purposes, a specified ester coupling agent. The coupling agent is required so that there will be no "spewing" of extender from the cured material.

The use of a coupling agent, however, carries a significant disadvantage. The insulating properties of these prior art polyurethanes are limited due to the presence of ester or other polar groups within the polyurethane structure. When these polyurethanes are used for repair or encapsulation of electrical devices, they are unable to restore the same electrical characteristics because of their higher dissipation factors. This, in turn, results in higher line losses and reduced transmission efficiencies.

DISCLOSURE OF THE INVENTION

It is, therefore, an object of the present invention to provide an extended polyurethane system which is applicable for use in the reclamation or encapsulation of telecommunication cable.

It is another object to provide a reclamation or encapsulation system which eliminates or significantly reduces the above-described disadvantages encountered with prior art systems.

It is still another object to provide a new extending agent for said systems which likewise improves upon the extending agents of the prior art.

It is a further object to provide extended polyurethane formulations which are defined in accordance with specific end use applications.

It has now been found that by utilizing cyclic olefins as the first extending agent for polyurethanes, the resulting systems are well suited for a number of end use applications including telecommunication cable reclamation and encapsulation or as general polyurethane elastomers. Such cyclic olefin extended polyurethanes comprise a specified polyurethane, a cyclic olefin, and, optionally, an ester coupling agent or second extender.

The cyclic olefins of the present invention are characterized by excellent compatibility with the polyurethane, a broad viscosity range, good electrical properties, and the absence of cracking or stressing tendencies on polycarbonate connectors. It is particularly in the area of compatibility with polyurethane and electrical properties that these polyurethanes exhibit significant improvements over prior art extender and ester coupling agent systems.

When used in the area of reclamation and encapsulation, the cyclic olefin extended polyurethane provides excellent performance characteristics. They possess the low viscosities necessary for initial introduction into the cable and the ability to retain these low viscosities for a period of time sufficient to enable it to fill the length of the free spaces in the cable or form a complete encapsulating cover. They also possess the ability to displace and/or repel fluid contaminants and cure in place to form a gel-like urethane structure which neither spews forth nor exudes the cyclic olefin. The gel structure is of sufficient rigidity to provide an excellent protective barrier, yet can be readily cut and removed if re-entry is desired. The polyurethane is non-corrosive to copper wire and compatible with the conventionally used polycarbonate connectors and other polymeric materials utilized in cable manufacture. The system is also convenient to handle and apply in the field.

The polyurethane which is used in the cyclic olefin extended polyurethane of the present invention is generally prepared by reacting approximately stoichiometric amounts of an organic polyisocyanate with a polyol. In a preferred embodiment, the organic polyisocyanate is a polyisocyanate prepolymer which is in turn prepared by reacting an excess of a polyisocyanate compound with a polyol in a manner well known in the art. The polyisocyanate prepolymer is then reacted with the polyol in the presence of the cyclic olefin and optionally, an ester coupling agent or other type extender to form the cyclic olefin extended polyurethane. In a second embodiment, the organic polyisocyanate is a polyisocyanate compound which directly reacts with the polyol in the presence of the cyclic olefin and optionally, an ester coupling agent or other type extender to form the cyclic olefin extended polyurethane.

The organic polyisocyanate compounds which can be used for the preparation of the polyisocyanate prepolymer or reaction with the polyol to form the polyurethane include aliphatic polyisocyanates, cycloaliphatic polyisocyanates, or aromatic polyisocyanates. Typical of such polyisocyanate compounds are 3-isocyanatomethyl-3,5,5-trimethyl-cyclohexyl isocyanate (IPDI), toluene diisocyanate (TDI), 4, 4' diphenylmethanediisocyanate (MDI), polymethylene polyphenylisocyanate, 1, 5 naphthalene diisocyanate, phenylene diisocyanates, 4, 4'-methylene bis-(cyclohexylisocyanate), hexamethylene diisocyanate, biuret of hexamethylene diisocyanate, 2, 2,4-trimethylhexamethylene diisocyanate and combinations thereof, as well as related aromatic, aliphatic, and cycloaliphatic polyisocyanates which may be substituted with other organic or inorganic groups that do not adversely affect the course of the reaction.

The term "aliphatic," as used herein, includes those carbon chains which are substantially non-aromatic in nature. They may be saturated or unsaturated, unbranched, branched, or cyclic in configuration and may contain substituents which do not adversely affect migration. Such aliphatic isocyanates generally have an equivalent weight of from 60 to 160 and a viscosity of 1 to 1500 centipoises at 25° C. Exemplary of the liquid long chain aliphatic polyisocyanates are dodecyl diisocyanate, tridecyl diisocyanate, and the like. Polymethylene polyphenylisocyanate is commercially available from Mobay Chemicals under the trademark Mondur MRS. A diphenyl-methane diisocyanate is commercially available in a stabilized liquid form from Upjohn under the trademark Isonate 143L or from Mobay under the trademark Mondur CD. Various polyarylene polyisocyanates are commercially available from Upjohn under the trademark PAPI of which PAPI 94 is typical. PAPI 94 is a polymeric methylene diisocyanate containing approximately 98% of 4,4' isomer with the remaining 2% being the 2,4' isomer. PAPI 94 has an NCO content of approximately 2.

Specifically, Isonate 143-L is a light yellow, modified diphenyl-methane diisocyanate having an NCO content of 29.2 weight percent, an isocyanate equivalency of 144, an acidity value of less than 0.030 and a viscosity of 35 cps at 25° C., while Mondur CD is a light-yellow modified 4,4' diphenylmethane diisocyanate having an NCO content of 29.3 weight percent and a viscosity of less than 100 mPAs at 25° C.

The polyol which is reacted with the organic polyisocyanate is selected from the group consisting of castor oil, polyether polyols, hydroxyl bearing homopolymers of dienes, hydroxyl bearing copolymers of dienes, and combinations thereof. Such polyols generally have an equivalent weight of from 30 to 6000 and a viscosity of from 1 to 20,000 centipoises at 25° to 60° C.

The castor oil which may be used in the preparation of the cyclic olefin extended polyurethane is primarily composed of ricinolein which is a glyceride of ricinoleic acid. A typical castor oil comprises a mixture of about 70% pure glyceryl triricinoleate and about 30% glyceryl diricinoleate-monoleate or monolinoleate and is available from CasChem, Inc. as DB Oil.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Also, trifunctional compounds exemplified by the reaction product of trimethyol propane and propylene oxide may be employed. A typical polyether polyol is available from Union Carbide under the designation Niax PPG-425. Specifically, Niax PPG-425, a copolymer of a conventional polyol and a vinyl monomer, has an average hydroxyl number of 263, an acid number of 0.5, and a viscosity of 80 centistokes at 25° C.

The general term polyether polyols also includes polymers which are often referred to as amine based polyols or polymeric polyols. [Typical amine based polyols include sucrose-amine polyol such as Niax BDE-400 or FAF-529 or amine polyols such as Niax LA-475 or LA-700, all of which are available from Union Carbide.] As one skilled in the art would known, there are no free amino hydrogens in any of these compounds.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl groups having about 1 to about 4 carbon atoms, substituted aryl, unsubstituted aryl, halogen, and the like. Typical of such dienes are 1,3-butadiene, isoprene, chloroprene, 2-cyano-1,3-butadiene, 2,3-dimethyl-1,2-butadiene, and the like. The preferred dienes are 1,3-butadiene and isoprene. A hydroxyl terminated polybutadiene is available from ARCO Chemicals under the designation Poly-BD R-45HT.

Specifically, Poly-BD R-45HT has a molecular weight of about 2800, a degree of polymerization of about 50, a hydroxyl functionality of about 2.4 to 2.6, a hydroxyl number of 46.6, a hydroxyl value of 0.83, and an iodine number of 398.

A wide variety of aromatic and aliphatic diamines may form part of the amine-based polyols, such as N,N-bis(2-hydroxypropyl)aniline and N,N,N',N'-tetrakis(2-hydroxypropyl)ethylenediamine. A typical amine-based polyol is available from Upjohn under the designation Isonol 100, an amber colored liquid polyol having a molecular weight of 209, a hydroxyl number of 534, an equivalent weight of 104.5, an average functionality of 2.0 and a viscosity of 1450 at 50° C. while a typical aliphatic amine-based polyol is available from BASF under the designation Quadrol, a viscous liquid polyol with four hydroxyl groups two tertiary nitrogen atoms, a hydroxyl number of 770 and a viscosity of 53,000 cps at 25° C.

The general term polyether polyols also includes compounds which are referred to as polymeric polyols.

Polymeric polyols can be described as conventional polyols with a stable dispersion of vinyl polymers. For example, U.S. Pat. No. 4,104,236 discloses such polyols with acrylonitrile-styrene polymers; a further typical polyol is available from Union Carbide under the designation Niax 24-32. Specifically, Niax 24-32, a copolymer of a conventional polyol and a vinyl monomer, has an average hydroxyl number of 32 and a viscosity of 1300 centistokes at 25° C.

The cyclic olefins utilized herein as the first extenders typically include dipentene, pinene, dicyclopentadiene, and polycyclopentadiene, all of which are commercially available. The cyclic olefins consist of at least one 5 or 6 membered ring with at least one unsaturated bond. In addition to this one unsaturated ring, the compound may include saturated carbon chains, unsaturated carbon chains, saturated carbon rings, unsaturated carbon rings, or combinations of any of these carbon structures. These cyclic olefins can range from very low viscosities, in the case of low molecular weights, to high viscosities, in the case of high polymerization of these compounds. These compounds are compatible with polyurethanes without the use of additional compatibilizers, such as ester coupling agents. They can also be polymerized with other non-cyclic, unsaturated compounds to produce a material which is compatible with polyurethanes.

The polyurethanes of the present invention may also optionally contain a benzenoid compound along with the cyclic olefin extender. Typical benzenoid compounds include toluene and pyrrole, and these are also compatible with polyurethanes without the use of ester coupling agents. Both the cyclic olefin and cyclic olefin/benzenoid compound extended polyurethanes will not exhibit spewing of the extender and are utilized in concentration ranging from about 1-92 weight percent of the total extended polyurethane system.

As stated hereinabove, a coupling agent or compatibilizer such as an ester compound is not required for the extended polyurethane, and such coupling agents may optionally be used in the extended polyurethanes. In the case of highly polymerized cyclic olefins, a coupling agent can be used to lower the viscosity, if desired. When used, the coupling agent can range up to about 50 weight percent of the total extended polyurethane. Such compounds are non-reactive or substantially non-reactive with the polyurethane forming reactants. The applicable esters may be saturated or unsaturated and may be aliphatic, cycloaliphatic, or aromatic aliphatic. Typical esters include phthalates such as diundecylphthalate, diisodecylphthalate, 2-ethylhexyl phthalate, and mixtures of n-$C_9$, $C_{10}$, and $C_{11}$ phthalates, adipates such as diisodecyladipate and n-octyl-n-decyl adipate, glutarates, fumarates, sebacates, citrates, and the like, as well as polymeric esters such as Plastolein 9720 from Emery Industries, a plasticizer having an acid value of 3.0, a hydroxyl value of 20, and a viscosity of 207 centistokes at 100° F. to provide a low volatility material having good resistance to oil extraction.

The cyclic olefin extended polyurethane can also optionally include a second extender compound which can be used with or without a compatibilizer. Most oils commercially available for rubber processing may be used for oil extension of the extended polyurethanes of this invention. When used, these second extenders can range up to 50 weight percent of the total extended polyurethane. Examples of compounds included in the term processing oils are listed in U.S. Pat. No. 3,107,224, and they can be classified by source into the following groups: petroleum oils and asphalts, petroleum waxes, coal tar oils and pitches, esters, chlorinated hydrocarbons, pine tars and oils, phenols, and resins. All of these commercially available materials are essentially hydrocarbon, that is, at least about 50 weight percent carbon and hydrogen. Preferably, the oil is at least about 75 weight percent or more preferably at least about 90 weight percent carbon and hydrogen. As is apparent from the materials listed, the hydrocarbon chains or rings may be interrupted or terminated by non-hydrocarbon groups, for instance, ester, ether, or other oxygen-containing linkages.

Usable processing oils are characterized by a viscosity SSU at 100° F. of at least 30, and preferably at least about 70. Petroleum oils are most often used in extending natural and synthetic rubbers as well as the polyurethanes of this invention, and generally are categorized as paraffinic, napthenic (cycloaliphatic), aromatic, or asphaltic oils. However, processing oils which combine the characteristics of two or more of these types also may be employed. Viscosities frequently vary from about 100–600 SSU at 100° F. or 35–100 SSU at 210° F. although aromatic and/or asphaltic oils of up to 1000 or 2000 or more SSU at 100° F. are sometimes used.

Coal tar pitch, asphalts, asphaltenes, chlorinated biphenyl ethers, chlorinated waxes, chlorinated oils, rosin esters, certain esters and amides of styrene-maleic anhydride resins, coumarone-indene resins, polybutenes, as well as many other materials may be used, either alone or in conjunction with oils as a second extender. Aromatic and chlorinated oils may also be used as a second extender. Second extenders composed mainly of hydrocarbons are usually preferred because of their improved hydrolytic properties, oxidative properties, and lower cost. Other second extenders include the low molecular weight polybutenes or polyisobutylenes as well as the high boiling fractions of petroleum polymers ordinarily used for lubricants. Chlorinated aromatic and aliphatic hydrocarbons, aromatic ethers, and phosphorus derivatives are particularly advantageous, since they may impart some flame retardance to the finished product. The second extender may comprise up to about 40 weight percent of the cyclic olefin extended polyurethane.

In accordance with the extended polyurethanes of the present invention, finely divided solid fillers which are commonly employed in the art as either reinforcing or inert fillers can also be utilized. The use of such solid fillers applies mainly to non-reenterable polyurethanes. Conventional fillers include carbon black, asphaltenes, silica, silica-alumina, hydrated silica, zinc oxide, magnesium carbonates, clays, talc, and pulverized reclaimed rubber as well as various mineral fillers which are known in the art. Solid fillers may be employed in the amount of up to about 50 weight percent of the polyurethane.

The cyclic olefin extended polyurethane of the present invention is generally comprised of about 8 to 99 parts by weight of a polyurethane, and about 92 to 1 part by weight of a cyclic olefin. Optionally, up to about 50 parts by weight of an ester coupling agent, up to about 40 parts by weight of second extender, and up to 50 parts by weight of a solid filler can be added. The preferred concentration with particular reference to the reclaiming or encapsulating utility comprises about 8 to 75 parts by weight of a polyurethane, about 92 to 25 parts by weight of a cyclic olefin, and up to about 20 parts by weight of an oil extender or ester coupling agent.

The instant cyclic olefin extended materials are preferably prepared at the application site by admixing the resin system with the hardener system. Depending on the desired utility, the resin and hardener are utilized in amounts meeting the stoichiometric requirements. The resin component comprises the organic polyisocyanate, the cyclic olefin, and, if present, the benzenoid and coupling agent. The hardener component comprises the polyol, and, when present, a second portion of the same or different ester coupling agent, any extender oils or benzenoids, and a second portion of the cyclic olefin. The catalyst and optional additives such as fungicides, pigments, anti-oxidants, moisture scavengers, and the like, are generally added to the hardener component. Catalysts are known to those skilled in the art and may comprise, for example, heavy metals utilized in amounts of about 0.1 weight percent of the hardener component.

As noted, the cyclic olefin extended polyurethanes possess the desired properties for a range of utilities, with primary emphasis on utilities such as reenterable encapsulants and reclamants for insulated electrical devices. Initially, these materials are sufficiently fluid to be introduced into the core of a cable or mold surrounding the area of concern and to retain their fluidity for a period of time sufficient to fill all the interior free spaces.

In its reclaiming function, the polyurethane will thus displace the liquid penetrants in the free spaces. Thereafter, a stable gel forms within a reasonable period of time to provide a seal against penetration of water or other fluid materials. Where reenterability is desired, the selected polyurethane provides a gel which is sufficiently soft so as to be readily removed. The presence of a cyclic olefin produces a compatible extended polyurethane system without the use of an ester coupling agent. Due to the reduction or complete elimination of the polar groups present on the ester, the insulating properties of the reenterable encapsulant and reclamant are highly improved, particularly with regard to the dissipation factor and volume resistivity of the material. Furthermore, there is no exudation of extenders used and there is excellent compatibility with materials employed in the cable construction and with polycarbonate connectors. In addition, the instant extended polyurethanes can be utilized as hard volume (permanent) encapsulants and for general polyurethane elastomeric uses.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

EXAMPLE 1

The following examples illustrate the preparation of typical cyclic olefin extended polyurethane systems of this invention which are intended for use as reenterable encapsulants.

TABLE I

| Typical Resin Preparation | | | |
|---|---|---|---|
| Resin (parts) | A | B | C |
| polymethylene polyphenylisocyanate (1) | 36 | 12 | 24 |
| castor oil (2) | 13 | — | — |
| dioctyl adipate | 51 | 18 | — |
| polycyclopentadiene (3) | — | 70 | 76 |

TABLE II

| Typical Hardener Preparation | | | |
|---|---|---|---|
| Component | I | J | K |
| hydroxyl terminated polybutadiene (4) | 15.8 | 26.2 | 32.0 |
| castor oil (2) | 10.4 | 21.5 | 7.0 |
| polycyclopentadiene (3) | 37.2 | 20.0 | 61.0 |
| dioctyl adipate | 25.5 | 32.3 | — |
| mineral oil | 11.1 | — | — |

(1) PAPI 94 from Upjohn
(2) DB Oil from CasChem, Inc.
(3) ESCOPOL R-020 from Exxon, a high viscosity reactive polymer made from Diels-Adler reaction of cyclopentadiene and methyl cyclopentadiene.
(4) Poly-BD R45-HT from Arco Chemicals Mixes of 17 parts resin A and 83 parts hardener I, 50 parts resin B and 50 parts hardener J, and 20 parts resin C and 80 parts hardener K were prepared and formed stable, firm gels. These gels have tear strengths of about 4.0 pounds per linear inch, dielectric constants below 4.0 at 1 KHz, dissipation factors below 0.010 at 1 KHz, volume resistivities and insulation resistances above $1 \times 10^{13}$ ohm-cm. These characteristics clearly indicated these polyurethanes would make excellent reenterable encapsulants for insulation purposes. The mix viscosities at 25° C. for the A/I mix (300 cps) and for the B/J mix (400 cps) indicated these two polyurethanes would have excellent cable penetration in addition to their reenterability.

EXAMPLE 2

Additional resin systems were prepared according to Table III.

TABLE III

| Additional Resin Preparation | | | | | |
|---|---|---|---|---|---|
| Component | D | E | F | G | H |
| polymethylene polyphenyl-isocyanate (1) | 42 | 23 | 100.0 | 61 | 6 |
| castor oil (2) | 11 | — | — | 15 | — |

TABLE III-continued

| | Additional Resin Preparation | | | | |
|---|---|---|---|---|---|
| Component | D | E | F | G | H |
| dioctyl adipate | 23 | 33 | — | — | — |
| polycyclopentadiene (3) | 24 | 44 | — | 24 | — |
| dicyclopentadiene | — | — | — | — | 94 |

Polyurethane formulations were then prepared as indicated in Tables IV, V, and VI.

TABLE IV

| | HARDENER FORMULATIONS | | | | | | | | |
|---|---|---|---|---|---|---|---|---|---|
| Additional Hardner Systems | L | M | N | O | P | Q | R | S | T |
| Hydroxyl terminated polybutadiene (4) | 32.0 | 7.3 | 82.2 | — | 24.3 | 15.8 | 26.8 | 26.8 | 26.8 |
| Castor Oil (2) | 7.0 | 18.0 | 11.3 | 19.1 | 4.4 | 10.3 | 4.9 | 4.9 | 4.9 |
| Polyoxypropylene diol (5) | — | 11.5 | — | 28.1 | — | — | — | — | — |
| Polycyclopentadiene (3) | 48.5 | 34.5 | 6.5 | 31.4 | — | — | — | — | — |
| Dicyclopentadiene | — | — | — | — | 71.3 | — | — | — | — |
| Dipentene (6) | — | — | — | — | — | — | 68.3 | — | — |
| Alpha-pinene | — | — | — | — | — | — | — | 68.3 | — |
| pyridine | — | — | — | — | — | 54.2 | — | — | — |
| pyrrole | — | — | — | — | — | — | — | — | 68.3 |
| dioctyl adipate | — | 28.7 | — | 14.3 | — | 19.7 | — | — | — |
| dibutyl phthalate | — | — | — | 7.1 | — | — | — | — | — |
| Mineral Oil | 12.5 | — | — | — | — | — | — | — | — |

(1) PAPI 94 from Upjohn
(2) DB Oil from CasChem, Inc.
(3) ESCOPOL R-020 from Exxon, a high viscosity reactive polymer made from the Diels-Alder reaction of cyclopentadiene and methyl cyclopentadiene
(4) Poly-BD R45-HT from ARco Chemicals
(5) Poly G 20-28 from Olin, a propoxylated diol having a molecular weight of about 4,000

TABLE V

| | POLYURETHANE FORMULATIONS | | | | | | | | |
|---|---|---|---|---|---|---|---|---|---|
| Formulation | U | V | W | X | Y | Z | a | b | c |
| Polymethylene polyphenylisocyanate (1) | 6.1 | 6.1 | 6.1 | 6.1 | 6.1 | 6.1 | 4.9 | 4.9 | 4.9 |
| Hydroxyl terminated polybutadiene (2) | 13.1 | 13.1 | 13.1 | 13.1 | 13.1 | 13.1 | 26.3 | 26.3 | 26.3 |
| Castor Oils (3) | 10.8 | 10.8 | 10.8 | 10.8 | 10.8 | 10.8 | 3.9 | 3.9 | 3.9 |
| Drakeol 35 (4) | 70.0 | — | — | — | — | — | 35.1 | — | — |
| Sunthene 0-120 (5) | — | 70.0 | — | — | — | — | — | — | — |
| Dicyclopentadiene | — | — | 70.0 | — | — | — | — | — | — |
| Polycyclopentadiene (6) | — | — | — | 70.0 | — | — | — | 35.1 | 64.9 |
| Dipentene | — | — | — | — | 70.0 | — | — | — | — |
| Alpha-pinene | — | — | — | — | — | 70.0 | — | — | — |
| Dioctyl adipate | — | — | — | — | — | — | 29.8 | 29.8 | — |

(1) PAPI 94 from Upjohn
(2) Poly-BD R45-HT from Arco Chemical
(3) DB Oil from CasChem, Inc.
(4) Mineral Oil from Penreco, a white mineral oil having a viscosity of 65.3-70 centistokes at 40° C. and a specific gravity of between 0.865-0.882 at 60° F.
(5) a mineral oil from Sun Oil having a viscosity of 108.2 centistokes at 100° F., a refractive index of 1.5104, and a carbon atom content of 15% aromatic, 43% napthenic, and 42% paraffinic carbon atoms.
(6) ESCOPOL R-020 from Exxon, a high viscosity reactive polymer made from the Diels-Alder reaction of cyclopentadiene and methyl cyclopentadiene.

TABLE VI

| | Polyurethane Preparation | | | |
|---|---|---|---|---|
| | | | Weight Ratio | |
| Formulation # | Resin | Hardener | Resin | Hardener |
| 4 | G | L | 20 | 80 |
| 5 | D | M | 20 | 80 |
| 6 | E | N | 30 | 70 |
| 7 | A | O | 17 | 83 |
| 8 | H | P | 50 | 50 |
| 9 | A | Q | 17 | 83 |
| 10 | F | R | 5 | 95 |
| 11 | F | S | 5 | 95 |
| 12 | F | T | 5 | 95 |

Formulations 4, 5, 7, 9, 10, 11 and 12 were identified for use as reenterable encapsulants in view of their tear strengths, viscosities, and excellent electrical properties. Formulation 6 was identified for use as a non-reenterable encapsulant, i.e. a permanent polyurethane. Formulation 8 was identified for use in cable reclamation due to its low viscosity.

EXAMPLE 3

This example illustrates the improved compatibility and electrical properties of the instant polyurethane systems.

The following comparison systems are reflective of the prior art ester coupling agent requirement versus the instant cyclic olefin or benzenoid compound extended polyurethanes.

Gels of formulations U and V were opague and produced spewing of mineral oil due to the incompatibility with the polyurethane in the absence of an ester coupling agent. However, formulations W, X, Y and Z were clear, dry, firm gels illustrating the excellent compatibility of these cyclic olefins with the polyurethane.

In order to compare electrical properties of the old art versus the polyurethanes of the present invention, an ester coupling agent was required since the mineral oil formulation could not be tested without being compatible.

The following table shows the comparison of formulations a, b, and c for dissipation factor, volume resistivity and dielectric constant.

| Formulation | dissipation factor (1 KHz) | volume resistivity (ohm-cm) | dielectric constant (1 KHz) |
|---|---|---|---|
| a | 0.011 | $1 \times 10^{12}$ | 3.20 |
| b | 0.009 | $1 \times 10^{13}$ | 3.10 |
| c | 0.007 | $1 \times 10^{14}$ | 3.00 |

It is thus seen that the cyclic olefin extended polyurethanes of the instant invention exhibit significantly improved compatibility and electrical properties.

In summary, this invention provides novel cyclic olefin extended polyurethane systems. Variation may be made in procedures, proportions, and materials without departing from the scope of the invention as defined by the following claims.

Having thus described our invention, what we claim as new and desire to secure by Letters Patent is:

1. A cyclic olefin extended polyurethane gel composition comprising the liquid reaction product of an organic polyisocyanate wih a polyol having an equivalent weight of between about 230 and 6,000 in the present of a first extender comprising a liquid cyclic olefin which is compatible with the resulting polyurethane; the polyisocyanate/polyol reaction product being present in an amount of about 8 to 49 parts by weight, and the cyclic olefin being present in an amount of about 90 to 51 parts by weight.

2. The system of claim 1 wherein said polyisocyanate is selected from the group consisting of aliphatic, cycloaliphatic, and aromatic polyisocyanates.

3. The composition according to claim 2 wherein said polyisocyanate is polymethylene polyphenylisocyanate or diphenyl methane diisocyanate.

4. The composition according to claim 1 wherein said polyisocyanate is a polyisocyanate prepolymer prepared by reacting an excess of a polyisocyanate compound and a polyol.

5. The composition according to claim 1 wherein said polyol is selected from the group consisting of castor oil, polyether polyols, hydroxyl-bearing homopolymers of dienes, hydroxyl-bearing copolymers of dienes, and mixtures thereof.

6. The composition according to claim 5 wherein said polyol is a hydroxyl terminated polybutadiene.

7. The composition according to claim 1 which further comprises up to about 50 parts by weight of a coupling agent.

8. The composition according to claim 1 wherein the cyclic olefin component further comprises a benzenoid compound.

9. The composition according to claim 1 which further comprises up to about 50 parts by weight of a second extender.

10. A cyclic olefin extended polyurethane gel composition comprising the liquid reaction product of an organic polyisocyanate with a polyol having an equivalent weight of between about 230 and 6,000 in the presence of a first extender of a liquid cyclic olefin selected from the group consisting of dipentene, pinene, dicyclopentadiene, and polycyclopentadiene, the polyisocyanate/polyol reaction product being present in an amount of about 8 to 99 parts by weight, and said cyclic olefin being present in an amount of about 92 to 1 part by weight.

11. The composition according to claim 10 which further comprises up to about 20 parts by weight of a coupling agent.

12. The composition according to claim 10 which further comprises up to about 20 parts by weight of a second extender.

13. The composition according to claim 11 wherein said coupling agent is selected from the group consisting of phthalates, adipates, glutarates, fumarates, sebacates, citrates, and mixtures thereof.

14. The composition according to claim 13 wherein said coupling agent is diundecylphthalate, diisodecylphthalate, or diisodecyladipate.

15. The composition according to claim 12 wherein said second extender is selected from the group consisting of processing oils and solid fillers.

16. The composition according to claim 12 wherein said second extender is a paraffinic or naphthenic mineral oil.

17. A process for providing a fluid impervious re-enterable protective seal around an insulated electrical device which comprises:
(a) introducing a cyclic olefin extended polyurethane gel composition comprising the liquid reaction product of an organic polyisocyanate with a polyol having an equivalent weight of between about 230 and 6,000 in the presence of a liquid cyclic olefin selected from the group consisting of dipentene, pinene, dicyclopentadiene, and polycyclopentadiene into a confined space surrounding the section of the device to be protected; and
(b) allowing said composition to cure.

18. An insulated electrical device comprising a plurality of insulated wire conductors and a cured re-enterable cyclic olefin extended polyurethane gel composition comprising the liquid reaction product of an organic polyisocyanate with a polyol having equivalent weight of between about 230 and 6,000 in the presence of a first extender comprising a liquid cyclic olefin selected from the group consisting of dipentene, pinene, dicyclopentadiene, and polycyclopentadiene.

19. The process according to claim 17 wherein said insulated electrical device is encapsulated.

20. The process according to claim 19 wherein said gel composition comprises about 30 to 60 parts polyisocyanate polyol reaction product and about 40 to 70 parts liquid cyclic olefin.

21. A process for providing a fluid impervious re-enterable protective seal in the interior free spaces of an insulated electrical device which comprises;
(a) introducing a cyclic olefin extended polyurethane gel composition comprising the liquid reaction product of an organic polyisocyanate with a polyol having an equivalent weight from about 230 to 6,000 in the presence of a liquid cyclic olefin selected from the group consisting of dipentene, pinene, dicyclopentadiene, and polycyclopentadiene into the interior free spaces of the device; and
(b) allowing said composition to cure.

22. The process according to claim 21 wherein said gel composition is introduced into the interior free spaces or core of the insulated electrical device so as to displace liquid penetrants and reclaim the device.

23. The process according to claim 21 wherein said composition comprises about 8 to 30 parts polyisocyanate polyol reaction product and about 92 to 70 parts liquid cyclic olefin.

24. The process according to claim 17 further comprising up to about 40 parts by weight of a second extender and/or up to 50 parts by weight of a solid filler.

25. The process according to claim 21 further comprising up to about 40 parts by weight of a second extender and/or up to 50 parts by weight of a solid filler.

26. The encapsulated insulated electrical device produced according to claim 19.

27. The encapsulated insulated electrical device produced according to claim 20.

28. The reclaimed insulated electrical device produced according to claim 22.

29. The reclaimed insulated electrical device produced according to claim 23.

30. A cyclic olefin extended polyurethane gel composition consisting essentially of the liquid reaction product of an organic polyisocyanate with a polyol having an equivalent weight of between about 230 and 6000 in the presence of a liquid cyclic olefin which is compatible with the resulting polyurethane, the polyisocyanate/polyol reaction product being present in an amount of about 8 to 99 parts by weight, and the cyclic olefin being present in an amount of about 92 to 1 part by weight.

31. A process for providing a fluid impervious re-enterable protective seal around an insulated electrical device which comprises:
    (a) introducing a cyclic olefin extended polyurethane gel composition comprising from about 8 to 49 parts by weight of a liquid reaction product of an organic polyisocyanate with a polyol having an equivalent weight of between about 230 and 6,000 in the presence of between about 92 and 51 parts by weight of a liquid cyclic olefin which is compatible with the resulting polyurethane, into a confined space surrounding the section of the device to be protected; and
    (b) allowing said composition to cure.

32. The process according to claim 31 wherein said insulated electrical device is encapsulated.

33. A process for providing a fluid impervious re-enterable protective seal in the interior free spaces of an insulated electrical device which comprises;
    (a) introducing a cyclic olefin extended polyurethane gel composition comprising from about 8 to 49 parts by weight of a liquid reaction product of an organic polyisocyanate with a polyol having an equivalent weight from about 230 to 6,000 in the presence of between about 92 and 51 parts by weight of a liquid cyclic olefin which is compatible with the resulting polyurethane, into the interior free spaces of the device; and
    (b) allowing said composition to cure.

34. The process according to claim 33 wherein said gel composition is introduced into the interior free spaces or core of the insulated electrical device so as to displace liquid penetrants and reclaim the device.

35. A process for providing a fluid impervious re-enterable protective seal around an insulated electrical device which comprises:
    (a) introducing a cyclic olefin extended polyurethane gel composition consisting essentially of a liquid reaction product of an organic polyisocyanate with a polyol having an equivalent weight of between about 230 and 6,000 in the presence of a liquid cyclic olefin which is compatible with the resulting polyurethane, into a confined space surrounding the section of the device to be protected; and
    (b) allowing said composition to cure.

36. A process for providing a fluid impervious re-enterable protective seal in the interior free spaces of an insulated electrical device which comprises;
    (a) introducing a cyclic olefin extended polyurethane gel composition consisting essentially of a liquid reaction product of an organic polyisocyanate with a polyol having an equivalent weight from about 230 to 6,000 in the presence of a liquid cyclic olefin which is compatible with the resulting polyurethane into the interior free spaces of the device; and
    (b) allowing said composition to cure.

37. The encapsulated insulated electrical device produced according to claim 31.

38. The encapsulated insulated electrical device produced according to claim 32.

39. The encapsulated insulated electrical device produced according to claim 35.

40. The reclaimed insulated electrical device produced according to claim 33.

41. The reclaimed insulated electrical device produced according to claim 34.

42. The reclaimed insulated electrical device produced according to claim 36.

43. An insulated electrical device comprising a plurality of insulated wire conductors and a cured re-enterable cyclic olefin extended polyurethane gel composition comprising from about 8 to 49 parts by weight of a liquid reaction product of an organic polyisocyanate with a polyol having an equivalent weight of between about 230 and 6,000 in the presence of between about 92 and 51 parts by weight of a first extender comprising a liquid cyclic olefin which is compatible with the resulting polyurethane.

44. An insulated electrical device comprising a plurality of insulated wire conductors and a cured re-enterable cyclic olefin extended polyurethane gel composition consisting essentially of a liquid reaction product of an organic polyisocyanate with a polyol having an equivalent weight of between about 230 and 6,000 in the presence of a first extender comprising a liquid cyclic olefin which is compatible with the resulting polyurethane.

* * * * *